United States Patent
Soto et al.

(10) Patent No.: US 8,659,428 B2
(45) Date of Patent: Feb. 25, 2014

(54) METHOD AND SYSTEM FOR REDUCING EFFECT OF INTERFERENCE IN INTEGRATED METAL DETECTION/ELECTRONIC ARTICLE SURVEILLANCE SYSTEMS

(75) Inventors: Manuel A. Soto, Lake Worth, FL (US); Erik Lee Dinh, Boca Raton, FL (US); Adam S. Bergman, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 148 days.

(21) Appl. No.: 12/716,809

(22) Filed: Mar. 3, 2010

(65) Prior Publication Data

US 2011/0215928 A1  Sep. 8, 2011

(51) Int. Cl.
*G08B 13/14* (2006.01)

(52) U.S. Cl.
USPC ............ 340/572.1; 340/10.1; 340/568.1; 340/572.2; 340/572.3; 340/572.4; 340/572.5; 340/572.7

(58) Field of Classification Search
USPC ................... 340/10, 572, 568.1
See application file for complete search history.

(56) References Cited

U.S. PATENT DOCUMENTS

| | | | | |
|---|---|---|---|---|
| 2,337,352 A | * | 12/1943 | Sitterson, Jr. et al. | 324/243 |
| 4,622,543 A | * | 11/1986 | Anderson et al. | 340/572.1 |
| 6,362,739 B1 | | 3/2002 | Burton | |
| 2004/0199082 A1 | * | 10/2004 | Ostroff et al. | 600/509 |

FOREIGN PATENT DOCUMENTS

EP   736850 B2 * 7/2003

OTHER PUBLICATIONS

EPO International Search Report dated Dec. 23, 2011 for corresponding appln PCT/US11/00192.

* cited by examiner

*Primary Examiner* — Daniel Wu
*Assistant Examiner* — John Bamert
(74) *Attorney, Agent, or Firm* — Alan M. Weisberg; Christopher & Weisberg, P.A.

(57) ABSTRACT

An integrated electronic article surveillance ("EAS")/metal detection system. The system includes a transmitter operable to transmit an EAS interrogation signal, where the EAS interrogation signal establishes an interrogation zone and is used to detect EAS markers and metal objects within the interrogation zone. The EAS interrogation signal is transmitted at a first frequency during an EAS detection cycle and at a second frequency during a metal detection cycle. The system includes a receiver operable to detect a signal received from an EAS marker, and a metal detector module operable to detect a metal object in proximity to the integrated EAS/metal detection system, where the metal detector module includes a filter tuned to substantially filter out the first transmission frequency.

13 Claims, 3 Drawing Sheets

METHOD AND SYSTEM FOR REDUCING EFFECT OF INTERFERENCE IN INTEGRATED METAL DETECTION/ELECTRONIC ARTICLE SURVEILLANCE SYSTEMS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally electronic article surveillance ("EAS") systems, and more specifically to a method and system for reducing the impact of interference in an integrated EAS/Metal Detection system.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm.

Metal detection systems are also useful in detecting the unauthorized removal of metal items from a protected area. While there exist many metal detection systems, there has been no successful attempt to combine an EAS detection system with a metal detection system. While others have provided a metal detection system adjacent to an EAS system, no one has provided any mechanism for the increased efficiency and cost reduction of actually combining the two systems into one.

Part of the difficulty in combining both systems into one is the problems that arise due to interference from the transmission signals of other, adjacent EAS transmitters. If the metal detector is integrated with an acoustomagnetic ("AM") EAS system and both use the same transmitter electronics and tuned antenna coils to transmit both EAS and metal detection signals, an adjacent EAS transmitter will interfere with the metal detection receiver. Even if the metal detection frequency is different from the EAS frequency, the sidebands of the adjacent EAS transmitter will have a considerable impact in the metal detection receiver. The metal detection frequency cannot vary much from the EAS frequency because the metal detection transmission amplitude will be greatly reduced. This is due to the fact that the systems' antennas are tuned to the EAS transmit frequency.

Therefore, what is needed is an integrated EAS/metal detection system that reduces the impact of interference that may be caused by an adjacent EAS transmitter.

SUMMARY OF THE INVENTION

The present invention advantageously provides a method and system for reducing the effects of interference in an integrated electronic article surveillance ("EAS")/metal detection system. The system includes a transmitter operable to transmit an EAS interrogation signal, where the EAS interrogation signal establishes an interrogation zone and is used to detect EAS markers and metal objects within the interrogation zone. The EAS interrogation signal is transmitted at a first frequency during an EAS detection cycle and at a second frequency during a metal detection cycle. The system includes a receiver operable to detect a signal received from an EAS marker, and a metal detector module operable to detect a metal object in proximity to the integrated electronic article surveillance (EAS)/metal detection system, where the metal detector module includes a filter tuned to the first transmission frequency.

In one aspect of the invention, an integrated electronic article surveillance (EAS)/metal detection system is provided. The system includes a transmitter operable to transmit an interrogation signal, where the interrogation signal establishes an interrogation zone and is used to detect EAS markers and metal objects within the interrogation zone. The interrogation signal is transmitted at a first frequency during an EAS detection cycle and at a second frequency different from the first frequency, during a metal detection cycle. The system also includes a receiver operable to detect a signal received from an EAS marker and a metal detector module. The metal detector module includes a filter substantially centered at the first transmission frequency to filter out signals received substantially at the first transmission frequency during metal detection.

In another aspect, a method of reducing interference in an integrated electronic article surveillance (EAS)/metal detection system is provided. An EAS marker interrogation signal is transmitted at a first frequency to establish an interrogation zone. A metal detection signal is transmitted at a second frequency different from the first frequency. The presence of metal in the interrogation zone is detected at least in part by substantially filtering out interference signals received from adjacent EAS transmitters transmitting at the first frequency.

In accordance with still another aspect, the present invention provides a metal detection module in an integrated electronic article surveillance ("EAS")/metal detection system. The integrated EAS/metal detection system transmitting an EAS interrogation signal at a first frequency and a metal detection signal at a second frequency different than the first frequency. The metal detection module has a filter arranged to substantially filter signals received at the first transmission frequency and a controller operable to detect the presence of metals using the second transmission frequency.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
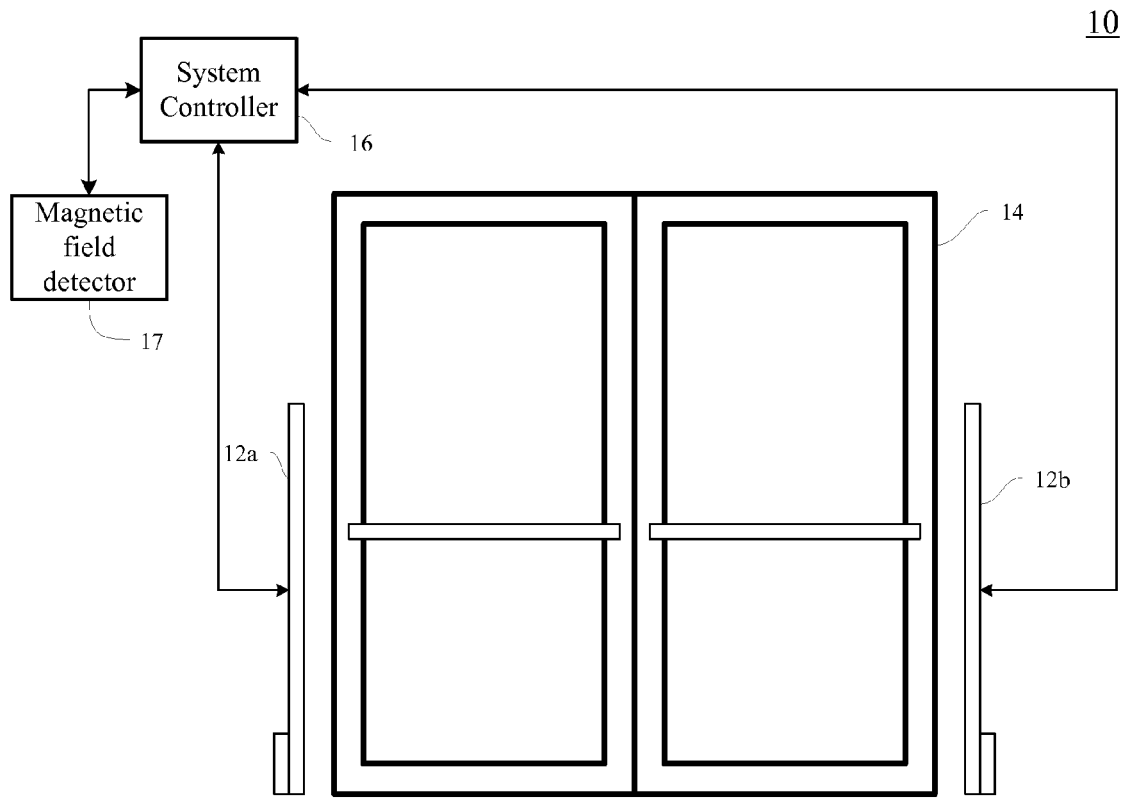
FIG. 1 is a block diagram of an exemplary acoustic electronic article surveillance ("EAS") detection system having integrated metal detection capabilities constructed in accordance with the principles of the present invention.

Before describing in detail exemplary embodiments that are in accordance with the present invention, it is noted that the embodiments reside primarily in combinations of apparatus components and processing steps related to implementing a system and method for reducing interference in an integrated EAS/Metal Detection system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention relates to combination EAS/metal detection systems and advantageously provides a method and system for reducing the impact of interference that might arise from adjacent EAS transmitters.

Referring now to the drawing figures in which like reference designators refer to like elements, there is shown in FIG. 1 one configuration of an exemplary integrated EAS/metal detection system 10 constructed in accordance with the principles of the present invention and located, for example, at a facility entrance. EAS detection system 10 includes a pair of pedestals 12a, 12b (collectively referenced as pedestal 12) on opposite sides of an entrance 14. One or more antennas for the EAS detection system 10 may be included in pedestals 12a and 12b, which are located a known distance apart. The antennas located in the pedestals 12 are electrically coupled to a control system 16 which controls the operation of the EAS detection system 10.

Figure 2:
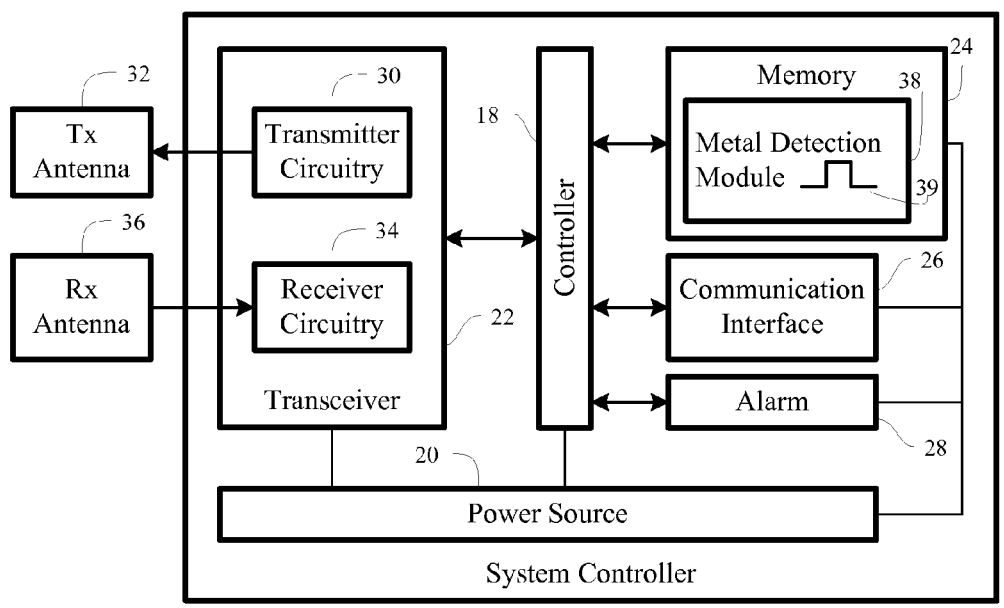
FIG. 2 is a block diagram of an exemplary integrated EAS/metal detection system controller constructed in accordance with the principles of the present invention.

Referring now to FIG. 2, an exemplary EAS control system may include a controller 18 (e.g., a processor or microprocessor), a power source 20, a transceiver 22, a memory 24 (which may include non-volatile memory, volatile memory, or a combination thereof), a communication interface 26 and an alarm 28. The controller 18 controls radio communications, storage of data to memory 24, communication of stored data to other devices, and activation of the alarm 28. The power source 20, such as a battery or AC power, supplies electricity to the EAS control system 16. The alarm 28 may include software and hardware for providing a visual and/or audible alert in response to detecting an EAS marker and/or metal within an interrogation zone of the EAS system 10.

The transceiver 22 may include a transmitter 30 electrically coupled to one or more transmitting antennas 32 and a receiver 34 electrically coupled to one or more receiving antennas 36. Alternately, a single antenna or pair of antennas may be used as both the transmitting antenna 32 and the receiving antenna 36. The transmitter 30 transmits a radio frequency signal using the transmit antenna 32 to "energize" an EAS marker within the interrogation zone of the EAS system 10. The receiver 34 detects the response signal of the EAS marker using the receive antenna 36.

In one embodiment, memory 24 may include a metal detection module 38 for detecting the presence of metal within the interrogation zone. Metal detection module 38 may be implemented in hardware and/or software and maybe situated either within memory 24 or outside of memory 24. Operation of the metal detection module 38 is described in greater detail below. Metal detection module 38 includes a filter 39 to filter out EAS interrogation signals from nearby EAS systems. Filter 39 can be a notch filter or any other equivalent device, or combination of devices operable to filter out a specific band of frequencies from a given signal. Although metal detection module 38 is shown as a software module stored within memory 24, metal detection module 38 may also be implemented by using discrete components or may be a combination of hardware and software elements. For example, in addition to or instead of controller 18, metal detection module 38 can, itself, have a controller or other processing unit that performs the filtering and metal detection functions described here. Further, although filter 39 is described herein as a "notch" filter, the invention is not limited to such. It is contemplated that any filter having a slope sufficient to isolate EAS signal frequencies can be used. For example, a filter with a slope sufficient to filter out a 58 kHz EAS interrogation signal when a 56 kHz metal detection signal can be used in the present invention.

Figure 3:
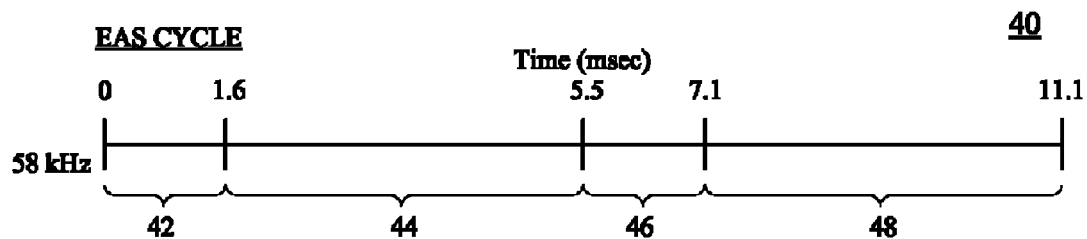
FIG. 3 is a timing diagram illustrating the timing scheme of an acoustic EAS detection system.

Referring now to FIG. 3, a timing diagram for an exemplary detection cycle 40 of one EAS system is shown. Taking advantage of the characteristics of the EAS marker, an EAS detection system may transmit a burst during one time period, then "listen" for a response signal at a subsequent time frame during one detection cycle 40. In one embodiment, the EAS detection cycle 40 includes four separate time periods: a transmit window 42, a tag detection window 44, a sync window 46 and a noise window 48. The exemplary detection cycle 40 is 11.1 msec in duration at a frequency of 90 Hz. At the start of the detection cycle 40, a 1.6-millisecond burst of a 58 kHz electro-magnetic ("EM") field, i.e. radio frequency signal, is transmitted during the transmit window 42 to "energize" an EAS marker having a natural resonant frequency at the same 58 kHz frequency. At the end of the transmit window 42, the EAS marker has already received and stored an appreciable amount of energy; therefore, the actual EAS marker becomes a source of energy/signal resonating at 58 kHz as its stored energy gradually dissipates (generally known as "ring down"). The transmitted EM field may be several orders of magnitude larger than the EAS marker signal. As a result, the receiver 34 does not operate during transmission. The receiver 34 starts to "listen" for the presence of the EAS marker signal after the transmitter 30 stops transmitting EM energy. During the tag detection window 44, the EAS marker signal can easily be detected as the background is quiet, i.e. the transmitter 30 is off. For verification purposes, the receiver 34 also listens again during the sync window 46 and noise window 48, i.e. 3.9 msec and 5.5 msec, respectively, after completion of the transmission of the EM energy burst. By this time, the energy in the EAS marker should be almost completely dissipated, and cannot be detected. However, if a signal still presents, it may indicate the presence of certain unknown interference source(s) and the alarm 28 will be disabled.

Figure 4:
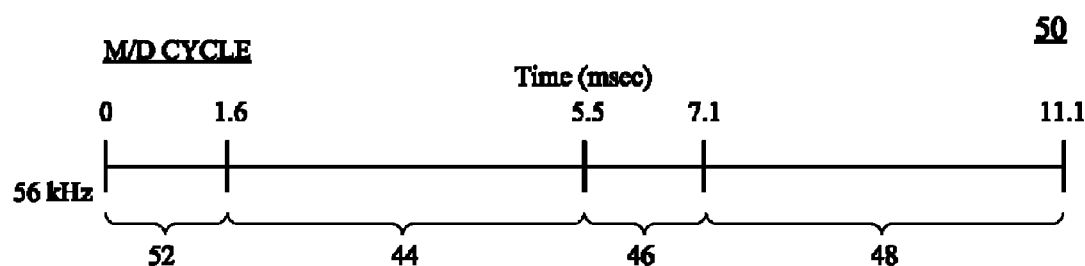
FIG. 4 is a timing diagram illustrating the timing scheme of an acoustic EAS detection system including a metal detection window according to the principles of the present invention.

Referring now to FIG. 4, in one embodiment of the present invention, a metal detection cycle 50 includes a metal detection window 52 in place of the transmit window 42. The remainder of the metal detection cycle 50 is the same as the original detection cycle 40, i.e. a tag detection window 44, a sync window 46 and a noise window 48. One method for detecting metal is based on induced eddy current during an EM excitation. The induced eddy current dissipates very quickly, on the order of tens of microseconds in the case of a good conductor. The dissipation is worse with a poor conductor. Even with a good conductor, eddy current dissipation is about two orders of magnitude shorter than that of the acoustic marker.

The EAS detection system 10 resumes marker detection after the termination of the metal detection transmission cycle 50. In this case, the same transmitting EM excitation may be used to detect both the presence of metal and the acoustic EAS marker, as shown in FIG. 4. While the EAS detection signal is typically transmitted at a frequency of 58 kHz, the metal detection interrogation signal is typically transmitted at a frequency of 56 kHz.

Figure 5:
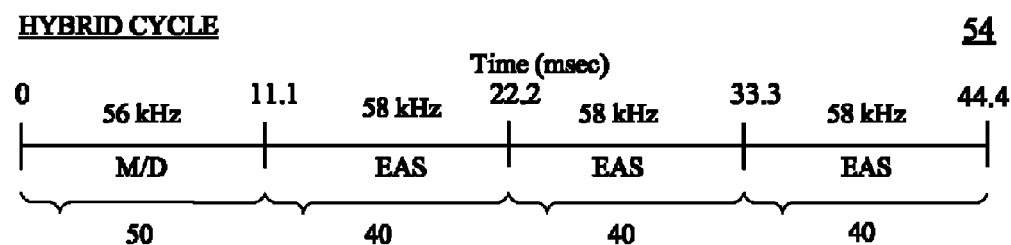
FIG. 5 is a timing diagram illustrating a hybrid cycle including interlacing metal detection and EAS-only windows according to the principles of the present invention.

FIG. 5 illustrates a hybrid cycle 54, where, in this example, there occurs one metal detection cycle 50 for every three cycles of EAS only detection cycles 40. It should be noted that the sequence and amount of metal detection cycles 50 interspersed per EAS only detection cycles 40 shown in FIG. 5 are for illustrative purposes only. Any combination and/or order of cycles are within the scope of the present invention. Because both the EAS and metal detection systems utilize the same transmitter electronics, the frequency at which metal detection transmission signals are propagated cannot be altered a great deal since the metal detection system is tuned to the EAS transmit frequency. In the embodiment of the present invention illustrated in FIGS. 4 and 5, the metal detection transmission frequency is set at approximately 56 kHz, which is different from the EAS transmission frequency of 58 kHz. However, because the EAS transmission and receive portions of cycle 40 are at a frequency of 58 kHz and metal detection transmission is at 56 kHz, there is the possibility that adjacent EAS detection systems will interfere with the metal detection transmission of the metal detection portion of the hybrid EAS/metal detection system.

To counteract the effects of interference that might be caused by adjacent EAS systems having EAS transmitters that are transmitting EAS interrogation signals at the same frequency as the signals transmitted by the integrated EAS/metal detection system 10 (i.e., 58 kHz), the metal detection module includes a notch filter 39 substantially centered at the EAS transmit frequency, in this case 58 kHz. This will "notch" or filter interference that might occur due to adjacent EAS transmitters transmitting at the 58 kHz frequency. In one embodiment, the notch filter 39 has a bandwidth of approximately 1 kHz-1.5 kHz, corresponding to 3 dB of attenuation.

Figure 6:
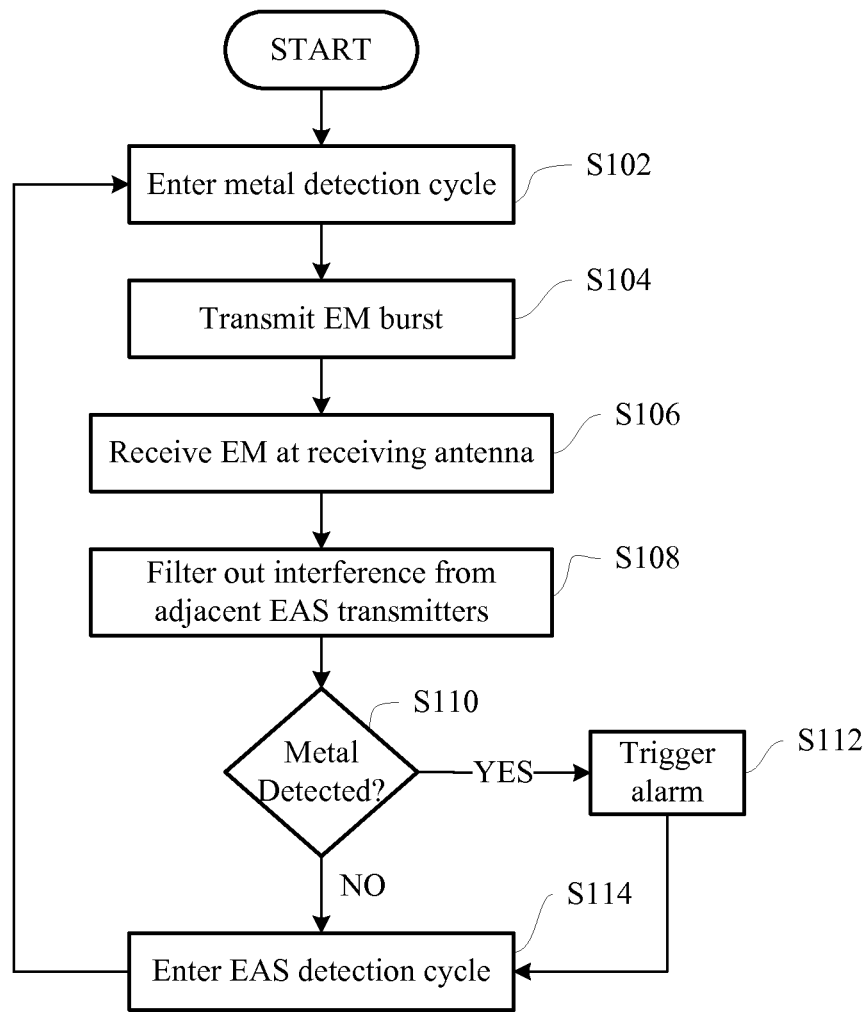
FIG. 6 is a flowchart of an exemplary metal detection process according to the principles of the present invention

FIG. 6 is a flowchart that illustrates an exemplary process performed by the metal detection module 38 incorporating the principles of the present invention. This method is based on detecting induced eddy current during an EM excitation. One embodiment of the present invention uses only one pedestal for transmitting EM energy while the other pedestal serves as a receiving antenna 36 for metal detection. The metal detection module 38 determines a baseline voltage ($V_r$) developed on the receiving antenna 36 without the presence of metal in the interrogation zone by transmitting a burst of EM energy through the transmit antenna 32 and measuring the voltage induced at the receiving antenna 36. During the transmission window 52 of the metal detection cycle 50, the induced voltage ($V_r$) developed on the sense coil in the receiving antenna 36 without the presence of metal is quite large due to the transmitting EM field.

Once the metal detection module 38 has determined the background voltage $V_r$, the system 10 enters a metal detection cycle 50 (step S102). During the metal detection cycle 50, a burst of EM energy is transmitted through the transmit antenna 32 (step S104) and received at the receiving antenna (step S106). The EM energy that is received may contain interference from surrounding EAS transmitters. Thus, the metal detection module 38 filters out this interference by utilizing a notch filter 39 that is substantially centered at the frequency of surrounding EAS transmitters, e.g., typically, 58 kHz (step S108).

In general, if metal is present in the interrogation zone, the received signal strength due to the eddy current effect is significantly smaller than the direct induction voltage induced during the transmitting EM field. It is then determined if metal is present in the interrogation zone (step S110). In one embodiment, if metal is present, the voltage induced is reduced to a value of $V_m$. The net effective received voltage ($V_s$) due to the presence of metal is calculated as $V_r - V_m$, which is a small fraction (~a few percent) of the $V_r$. If metal is detected, the metal detection module triggers an alarm (step S112). The alarm may be an audible, visual, or tactile alarm, or may notify a security guard or other authorized personnel of the detection of metal being carried through the EAS detection system 10. The system 10 then enters the EAS acoustic detection cycle 40 for a predetermined number of iterations (step S114) before repeating the metal detection cycle 50 (step S102).

As noted above, the induced eddy current dissipates very quickly, e.g., on the order of tens of microseconds in the case of a good conductor. As a result, the detection during the metal detection cycle 50 may be reduced compared to that in detection cycle 40 for EAS markers only, where both pedestals may be simultaneous transmitting. In this case, the same transmitting EM excitation may be used to detect both the presence of metal and the acoustic EAS marker. Once the metal detection cycle 50 is complete, both pedestals may be used for detecting the acoustic EAS markers.

Thus, the present invention provides an integrated EAS/metal detection system 10 that can filter out potentially interfering signals from adjacent EAS transmitters that are transmitting their interrogation signals at the same of substantially the same frequency as the EAS interrogation signals being transmitted by integrated EAS/metal detection system 10. By including a notch filter 39 within the metal detection module 38 that is tuned to the same frequency as adjacent EAS transmitters, extraneous signals may be removed, thus allowing metal detection module 38 to more accurately detect the presence of metal objects within the interrogation zone and not falsely trigger the metal detection alarm when there is no metal object within the interrogation zone.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An integrated electronic article surveillance ("EAS")/metal detection system comprising:
    a transmitter configured to periodically transmit an interrogation signal at a first frequency and at a second frequency different from the first frequency;
    a receiver configured to receive a first signal at the first frequency and a second signal at the second frequency;
    a controller configured to detect an EAS marker based on the received first signal at the first frequency when the transmitter is not transmitting; and
    a metal detector module configured to detect a metal object in proximity to the integrated electronic article surveillance/metal detection system by:
        receiving an output of the receiver when the transmitter is transmitting;
        filtering out signals received substantially at the first frequency;
        determining a first voltage of the second signal;
        comparing the first voltage to a second voltage; and
        responsive to determining that the first voltage is different from the second voltage by more than a prescribed amount, determining that the metal object is present.

2. The system of claim 1, wherein the metal detector module is configured to filter out signals received substantially at the first frequency with a notch filter.

3. The system of claim 1, wherein the metal detector module is configured to filter out signals received substantially at the first frequency with a filter configured to have a bandwidth of between substantially 1 kHz and substantially 1.5 kHz.

4. The system of claim 1, wherein the first frequency is substantially 58 kHz and the second frequency is substantially 56 kHz.

5. The system of claim 1, wherein the controller is electrically connected to the transmitter, to the receiver, and to the metal detector module.

6. The system of claim 1, wherein the metal detector module is configured to determine the metal object is present only in response to determining the first voltage is less than the second voltage by at least a predetermined threshold.

7. The system of claim 1, further comprising an alarm; and the metal detector module is further configured to trigger the alarm in response to the detection of the presence of the metal object in the interrogation zone.

8. The system of claim 1, further comprising:
    at least one transmit antenna in communication with the transmitter, the at least one transmit antenna tuned to the first frequency, the at least one transmit antenna arranged to transmit the interrogation signal at the first frequency and the interrogation signal at the second frequency; and
    at least one receive antenna in communication with the receiver, the at least one receive antenna tuned to the first frequency, the at least one receive antenna arranged to receive the first signal at the first frequency and the second signal at the second frequency.

9. The system of claim 1, wherein the transmitter is housed in a first pedestal and the receiver is housed in a second pedestal.

10. A method of reducing the effect of interference in an integrated electronic article surveillance ("EAS")/metal detection system comprising:
    periodically transmitting an interrogation signal at a first frequency and at a second frequency different from the first frequency;
    receiving a first signal at the first frequency and a second signal at the second frequency;
    detecting an EAS marker based on the received first signal at the first frequency when the transmitter is not transmitting;
    detecting a metal object in proximity to the integrated electronic article surveillance/metal detection system by:
        receiving an output of the receiver when the transmitter is transmitting;
        filtering out signals received substantially at the first frequency;
        determining a first voltage of the second signal;
        comparing the first voltage to a second voltage; and
        responsive to determining that the first voltage is different from the second voltage by more than a prescribed amount, determining that the metal object is present.

11. The method of claim 10, wherein filtering out signals received substantially at the first frequency is performed by a filter having a bandwidth between substantially 1 kHz and substantially 1.5 kHz.

12. The method of claim 10, wherein the first frequency is substantially 58 kHz and the second frequency is substantially 56 kHz.

13. A method for a metal detection module in an integrated electronic article surveillance ("EAS")/metal detection system, the integrated EAS/metal detection system including a transmitter configured to periodically transmit an interrogation signal at a first frequency and at a second frequency different than the first frequency, the integrated EAS/metal detection system including a receiver configured to receive a first signal at the first frequency and a second signal at the second frequency, the integrated EAS/metal detection system including a controller configured to detect an EAS marker based on the received first signal at the first frequency when the transmitter is not transmitting, the metal detection module configured to:
    detect a metal object in proximity to the integrated EAS/metal detection system by:
        receiving an output of the receiver when the transmitter is transmitting the interrogation signal at the second frequency;
        filtering out signals received substantially at the first frequency with a filter;
        determining a first voltage of the second signal;
        comparing the first voltage to a second voltage; and
        responsive to determining that the first voltage is different from the second voltage by more than a prescribed amount, determining that the metal object is present.

* * * * *